(12) United States Patent
Newport

(10) Patent No.: US 7,971,844 B2
(45) Date of Patent: Jul. 5, 2011

(54) REMOTE DEVICE ACCESS SYSTEM

(75) Inventor: Dwight Newport, Minneapolis, MN (US)

(73) Assignee: New Ports Helpers LLC, Minneapolis, MN (US)

( * ) Notice: Subject to any disclaimer, the term of this patent is extended or adjusted under 35 U.S.C. 154(b) by 12 days.

(21) Appl. No.: 12/701,855

(22) Filed: Feb. 8, 2010

(65) Prior Publication Data
US 2010/0207408 A1 Aug. 19, 2010

Related U.S. Application Data

(60) Provisional application No. 61/152,532, filed on Feb. 13, 2009.

(51) Int. Cl.
*F16M 13/00* (2006.01)
(52) U.S. Cl. .................. 248/544; 248/320; 294/19.1
(58) Field of Classification Search .................. 248/544, 248/317, 318, 320; 294/19.1
See application file for complete search history.

(56) References Cited

U.S. PATENT DOCUMENTS

| | | | | |
|---|---|---|---|---|
| 5,149,039 A | * | 9/1992 | Peterson et al. | 248/300 |
| 5,563,766 A | * | 10/1996 | Long et al. | 361/600 |
| 5,596,314 A | * | 1/1997 | Goldstein | 340/632 |
| 5,617,079 A | * | 4/1997 | Harrison | 340/693.7 |
| 6,543,735 B1 | * | 4/2003 | Haynes et al. | 248/300 |
| 6,644,617 B2 | | 11/2003 | Pitlor | |
| 6,672,636 B2 | | 1/2004 | Kelly | |
| 6,859,146 B2 | | 2/2005 | McGreal et al. | |
| 7,204,534 B2 | * | 4/2007 | Kelly | 294/19.1 |
| 7,587,926 B2 | * | 9/2009 | Ackerman | 73/1.02 |
| 2009/0194662 A1 | * | 8/2009 | Urrutia | 248/544 |
| 2010/0109357 A1 | * | 5/2010 | Lofley et al. | 294/19.1 |

FOREIGN PATENT DOCUMENTS

WO WO 02/073565 A1 9/2002

OTHER PUBLICATIONS

Grinnell® Fire Protection Systems Company, "Detector Accessories". 1998, VII-261/1198.

* cited by examiner

*Primary Examiner* — Ramon Ramirez
(74) *Attorney, Agent, or Firm* — IPLM Group, P.A.

(57) ABSTRACT

A remote device access system is provided. The system includes a receiving member, an engaging head and a containment cage. The receiving member is configured to be coupled to a device (such as a smoke detector and the like) that is to be positioned in an out of arms reach location. The engaging head is configured to be coupled to an elongated member. The engagement head is further configured to selectively engage the receiving member coupled to the device. The containment cage is configured to be coupled to a surface at the out of arms reach location. The containment cage forms a containing chamber that is configured to selectively hold the device. The elongated member is configured to place and remove the device from the containing chamber of the containment cage via the engaging head and receiving member.

19 Claims, 12 Drawing Sheets

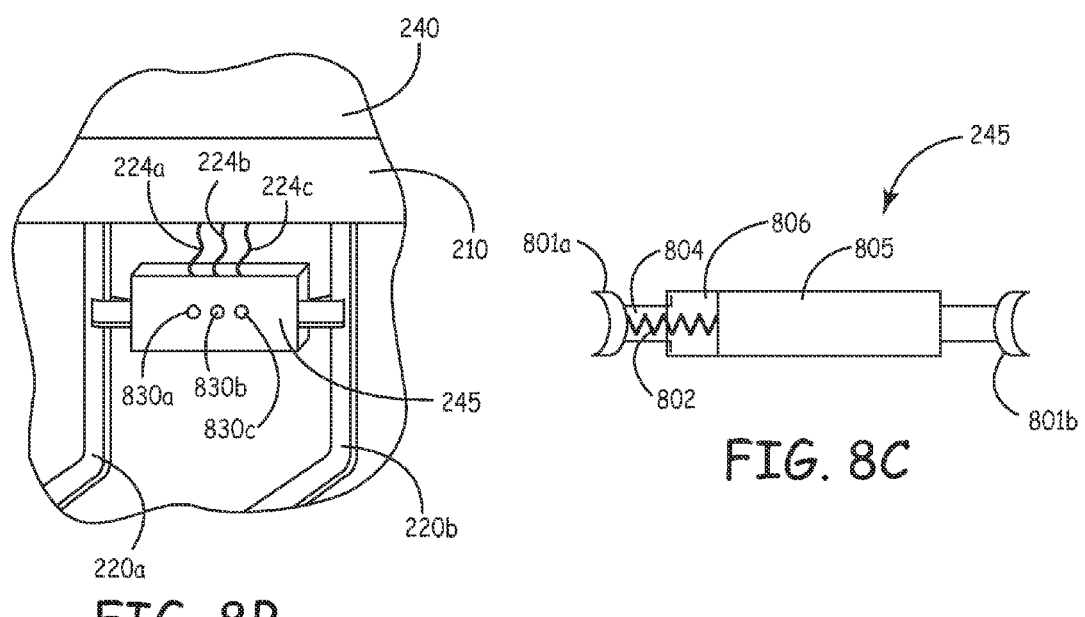

REMOTE DEVICE ACCESS SYSTEM

CROSS-REFERENCE TO RELATED APPLICATIONS

This application claims priority to U.S. Provisional Application Ser. No. 61/152,532, same title herewith, filed on Feb. 13, 2009, which is incorporated in its entirety herein by reference.

BACKGROUND

The placement of and the removal of alarm systems such as smoke detectors and carbon monoxide detectors in hard to reach places can be a challenge. For example, when the placement of the alarm is in a high location such as a ceiling a ladder may be required to reach the alarm for service such as to change the battery. Climbing a ladder can be difficult and dangerous for the elderly. Moreover, since it is recommended that the batteries be replaced twice a year in some alarms, having to access the alarm at least biyearly is likely.

For the reasons stated above and for other reasons stated below which will become apparent to those skilled in the art upon reading and understanding the present specification, there is a need in the art for accessing an alarm and the like in hard to reach locations without the use of a ladder.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a remote device access system is provided. The system includes a receiving member, an engaging head and a containment cage. The receiving member is configured to be coupled to a device that is to be positioned in an out of arms reach location. The engaging head is configured to be coupled to an elongated member. The engagement head is further configured to selectively engage the receiving member coupled to the device. The containment cage is configured to be coupled to a surface at the out of arms reach location. The containment cage forms a containing chamber that is configured to selectively hold the device. The elongated member is configured to place and remove the device from the containing chamber of the containment cage via the engaging head and receiving member.

BRIEF DESCRIPTION OF THE DRAWINGS

The present invention can be more easily understood and further advantages and uses thereof more readily apparent, when considered in view of the detailed description and the following figures in which:

FIG. 8B is a close-up view of an electric receiver of one embodiment of the present invention;

FIG. 8C is a top view of the electric receiver of FIG. 8B;

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 1:
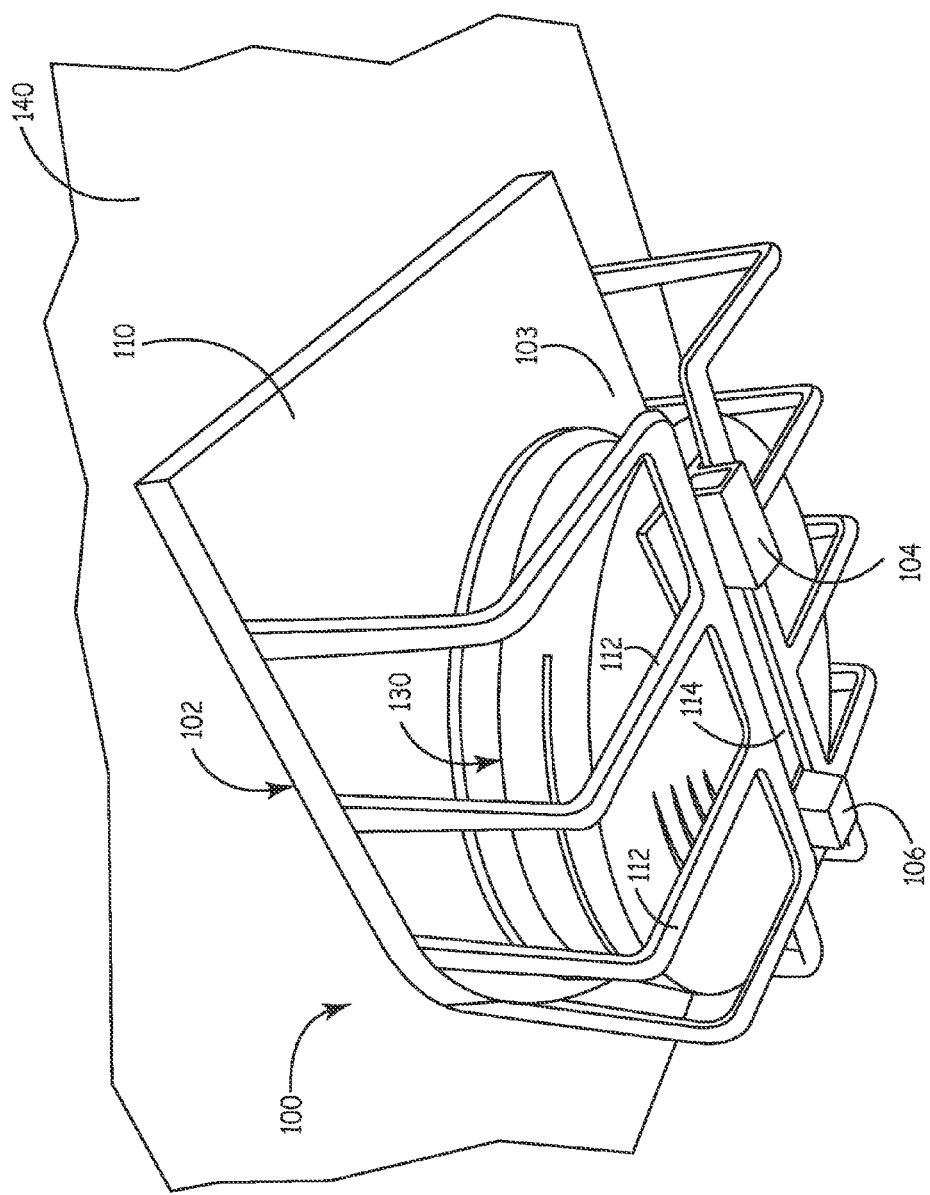
FIG. 1 is a side perspective view of a portion of a remote device access system of one embodiment of the present invention.

Embodiments of the present invention provide a method and system of accessing devices such as, smoke detectors, heat detectors, gas detectors (such as carbon monoxide detectors), and the like that are positioned in out of arms reach locations. Moreover, embodiments can be used with off the self devices. Referring to FIG. 1, a side perspective view of a portion of a remote device access system 100 of one embodiment is illustrated. The remote device access system 100 in this embodiment includes a containment cage 102 (cage), a guide member 106 and a receiving member 104. The cage 102 is coupled to a ceiling or wall 140 in a location of a building where the device 130 is to be located. The cage 102 includes a base 110 that is configured to be coupled to the ceiling or wall 140. Holding arms 112 extend from the base. The holding arms 112 (arms) form a chamber with the base 110 upon which the device 130 can be held. The base 110 can be made of any suitable material such as but not limited to, wood, plastic, composite material, or metal. The arms 112 can be made of any suitable material also including plastic, metal, wire, composite material, and the like. The space between arms 102 is designed to provide sufficient airflow to the device 130 so the device can operate as designed by the manufacture.

Figure 2:
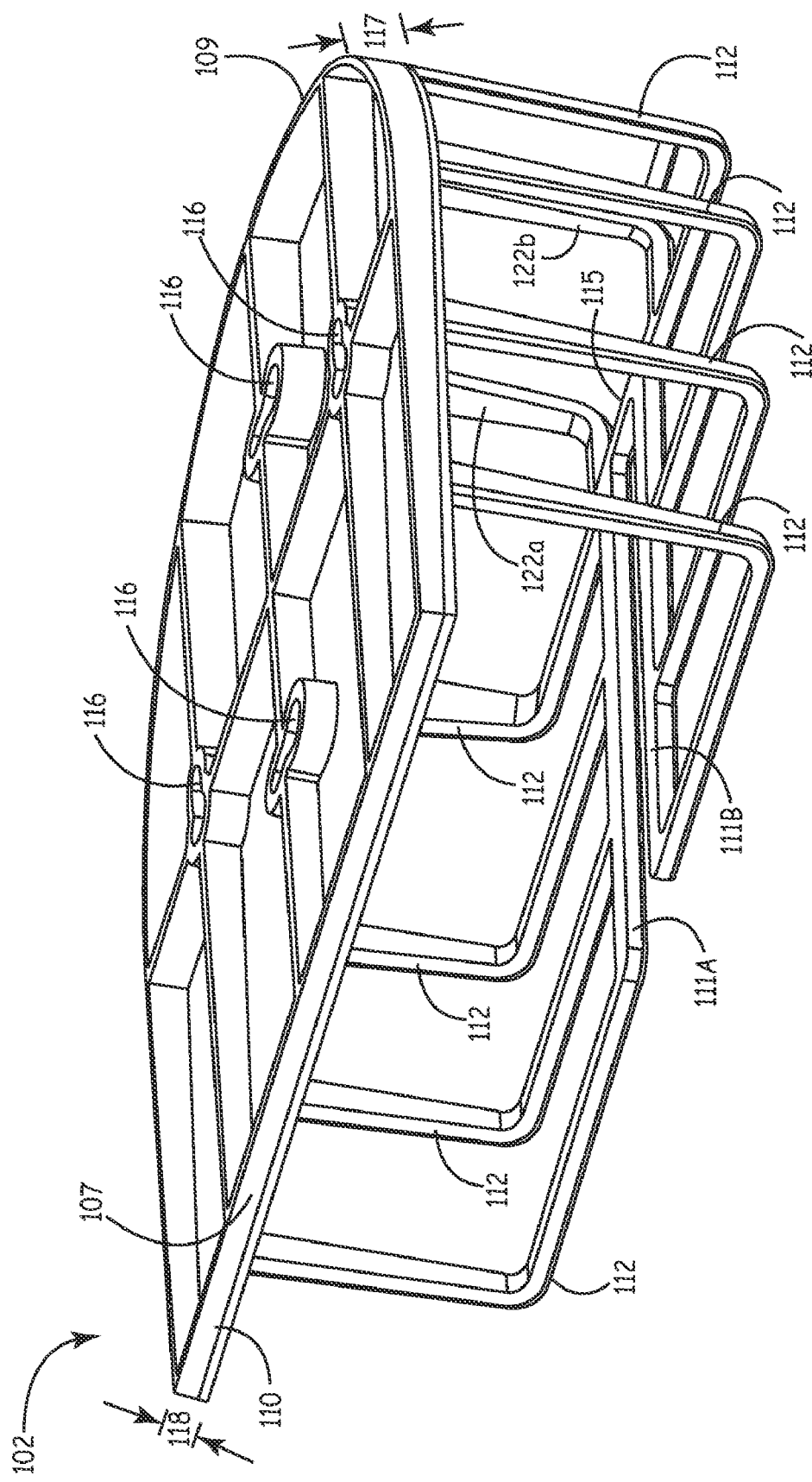
FIG. 2 is a front perspective view of a containment cage of one embodiment of the present invention.

As further illustrated in FIG. 1 a receiving slot 114 is formed in the containment cage 102. The receiving slot 114 receives a guide member 106 and a receiving member 104 coupled to the device 130. As illustrated, the guide member 106 and the receiving member 104 extend out of the cage 102 when received in the slot 114. In the embodiment illustrated in FIG. 1, the base 110 generally has a U-shape with a straight edge portion and a curved edge portion. The spaced arms 112 which are generally L-shaped extend from the base 110 about the curved edge portion. As the front perspective view of FIG. 2 illustrates, slot 114 is defined by rails 111A, 111B and end rail 115 that are generally in a U-shape in this embodiment. Arm ends terminate in respective rails 111A and 111B. Arms 112 also include back arms 122a and 122b. Each back arm 122a and 122b in the embodiment of FIGS. 1 and 2 extends from the base 110 and terminates with (and are coupled to) a respective arm 112 as illustrated. An opening to a chamber 103, formed by the cage 102 and the base 110, faces the straight edge (front end 107) of the base. An opening to the slot 114 also faces the front end 107 of the base 110. As further illustrated in FIG. 2, the base 110 includes attaching apertures 116. Fasteners, such as but not limited to, screws pass through the attaching apertures 116 to attach the containment cage 102 to the respective structure such as a ceiling or wall of a building. The base 110 in this embodiment includes the front end 107 and a back end 109. A front height 118 of the front end 107 of the base 110 is less than a back height 117 of the back end 109 of the base 110. This design feature causes a device 130 contained within the containment cage 112 to slide towards the back end 109 due to gravity thereby maintaining the device within the containment cage 102.

Figure 3A:
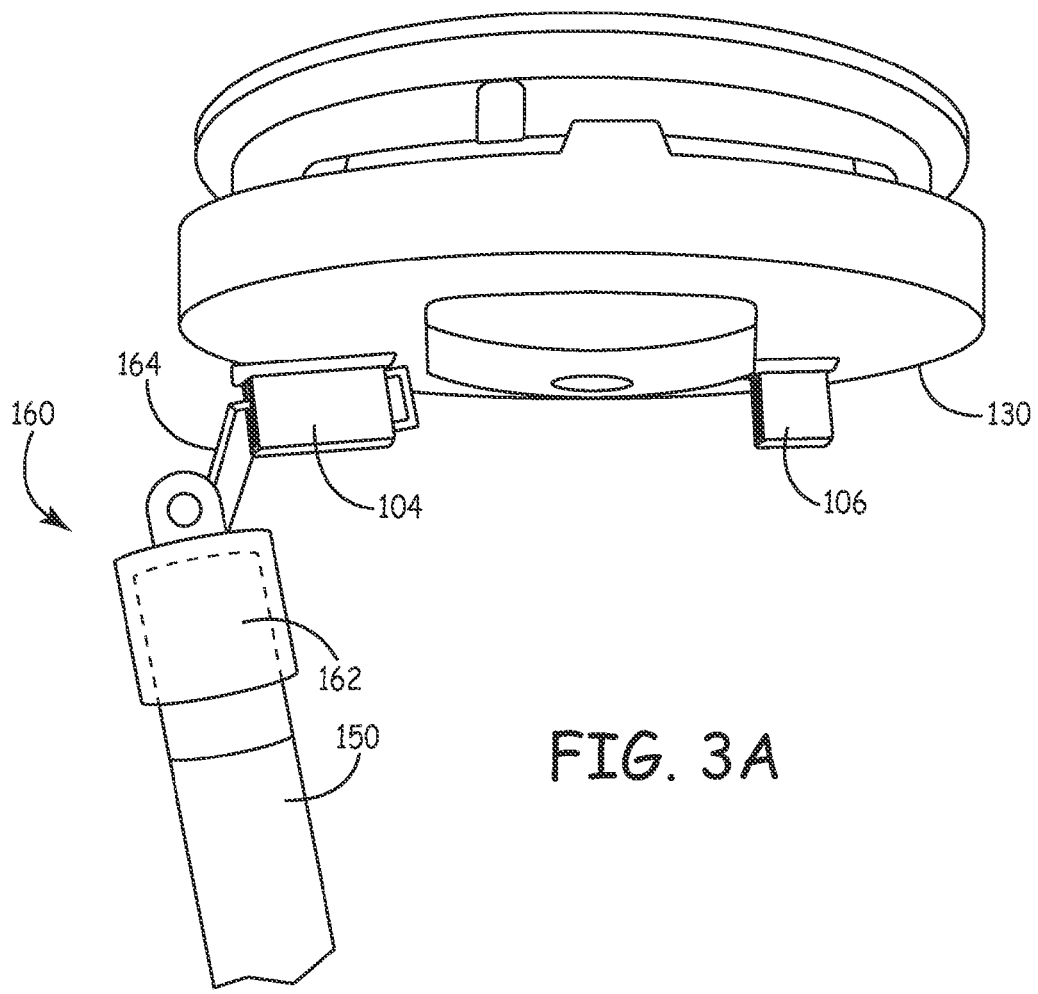
FIG. 3A is a side perspective view of an engaging head of a remote access system of one embodiment of the present invention engaging a device.
Figure 3B:
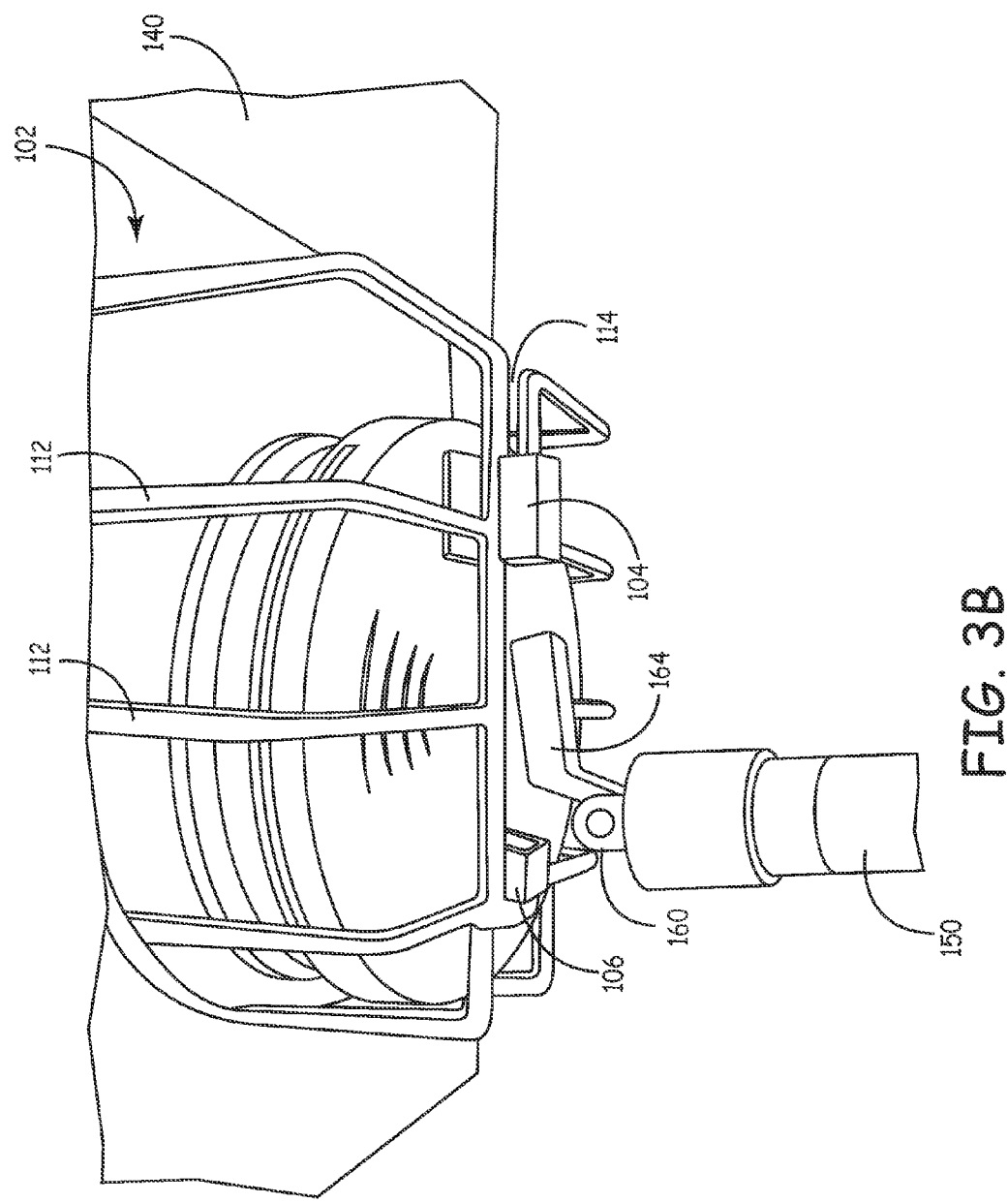
FIG. 3B is side perspective view of the engaging head of FIG. 3A being positioned to engage a receiving member in one embodiment of the present invention.

Referring to FIG. 3A a side perspective view of an engaging head 160 engaging a receiving member 104 that is coupled to a device 130 of an embodiment is illustrated. In particular, FIG. 3A illustrates the lifting of a device 130 with an elongated member 150. In an embodiment of the present invention, engaging head 160 is designed to be coupled to an elongated member 150. The engaging head 160 includes a connecting portion 162 that is configured to receive an end of the elongated member 150 and an engaging portion 164 that is configured to be received in a passage of the receiving member 104. The elongated member 150 can be any type of stick, rod, telescoping rod, broom stick and the like. The receiving member 104 and the guide member 106 are coupled to the device 130 as illustrated in 3A. Once the engaging head 160 has been coupled to the elongated member 150, an operator simply places the engaging portion 164 of the engaging head 160 in the passage of the receiving member 104 that is coupled to the device 130. The operator can then lift the device 130 up to and into the cage 102 by the elongated member 150. Hence, no ladder is needed. The device 130 is placed in the cage 102 by sliding the guide 106 and the receiving member 106 in slot 114. FIG. 3B illustrates a side perspective view of how the engaging head 160 can be used to remove the device 130 from the cage 102. In particular FIG. 3B illustrates the positioning of the engaging member 164 of the engaging head 160 in relation to the receiving member 104 on the device 130. The operator simply places the engaging member 164 of the engaging head 160 into the passage of the receiving member 104 with the use the elongated member 150. The operator then simply slides the device 130 out of the cage 102 by sliding the receiving member 104 and the guide member 106 out of the slot 114.

Figure 4A:
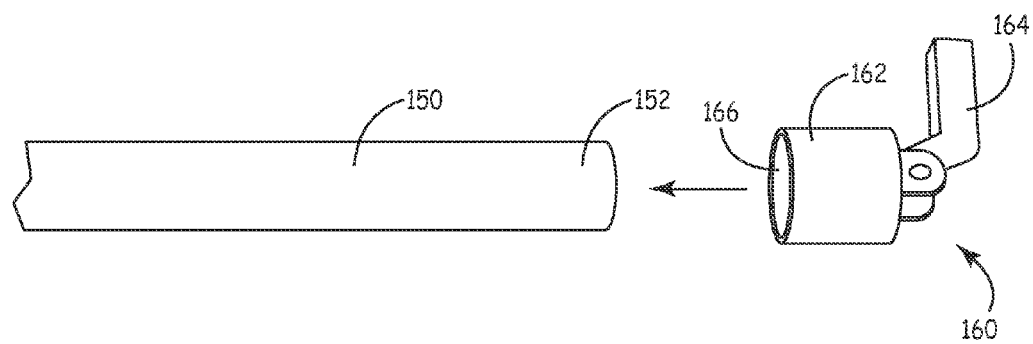
FIG. 4A is a side perspective view of an engaging head of FIG. 3A being positioned to be coupled to an elongated member of one embodiment of the present invention.
Figure 4B:
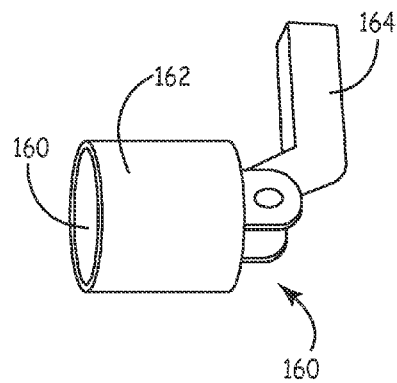
FIG. 4B is a side perspective view of the engaging head of FIG. 3A having its engaging member in a first position.
Figure 4C:
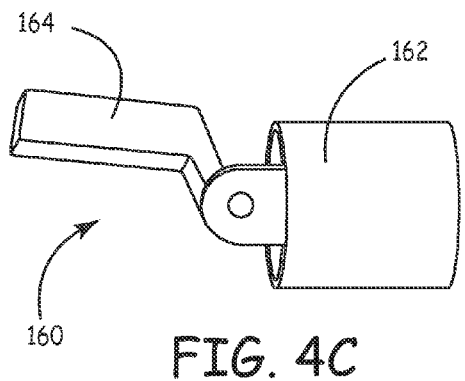
FIG. 4C is a side perspective view of an engaging head of FIG. 3A having its engaging member in a second position.
Figure 4D:
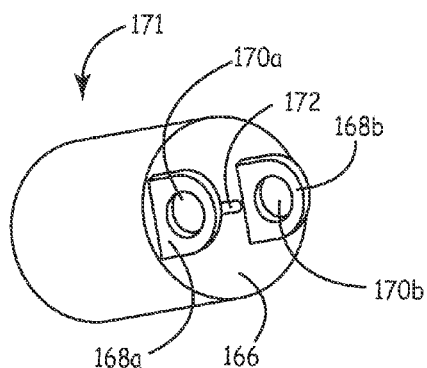
FIG. 4D is a end perspective view of a connecting portion of an engaging head of another embodiment of the present invention.
Figure 4E:
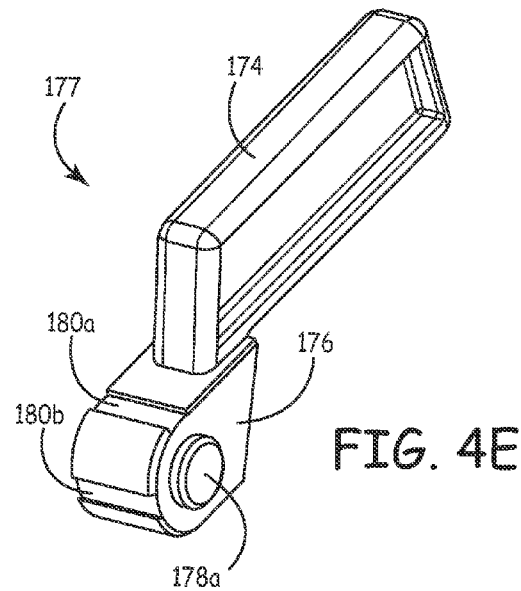
FIG. 4E is an engaging member of an engaging head of one embodiment of the present invention.

FIG. 4A illustrates a side view of an engaging head 160 and elongated member 150 of one embodiment. As illustrated, an end 152 of the elongated member 150 is received in a head channel 166 of the connecting portion 162 of the engaging head. FIG. 4B illustrates a side perspective view of the engaging head 160 having its engaging member 164 in a first position. This first position is used by the operator when placing or removing a device 130 from a cage 102 that is mounted to a ceiling 140. FIG. 4C illustrates engaging head 160 having its engaging member 164 in a second position. The second position is used by the operator when placing or removing a device 130 from a cage 102 that is coupled to a wall. Hence, the engaging head 160 of embodiments can be adjusted to position and remove a device 130 from a cage 102 whether the cage 102 is mounted to a ceiling or a wall. FIG. 4D illustrates a side perspective view of a connecting portion 171 of an engaging head of another embodiment. The connecting portion 171 includes a first connecting tab 168a and a second connecting tab 168b extending from an end 166 of the connecting portion 171. The first connecting tab 168a includes a first receiving aperture 170a and the second connecting tab 168b includes a second receiving aperture 170b. The first receiving aperture 170a of the first connecting tab 168a is aligned with the second receiving aperture 170b of the second connecting tab 168b. Also illustrated in FIG. 4D is a rise member 172 extending from end 166 between the first connecting tab 168a and second connecting tab 168b. FIG. 4E illustrates an engaging member 177 of an engaging head that is designed to engage the connecting portion 171 of FIG. 4D. The engaging member of 177 includes an engaging portion 174 that is configured to engage a receiving member such as receiving member 104 of FIG. 1. The engaging member 177 also includes an engaging base 176. The engaging base 176 includes opposing connecting hubs such as connecting hub 178a and an opposing connecting hub (not shown). The connecting hubs 178a are received in the respective first and second receiving apertures 170a and 170b of the connecting portion of the engaging head to form a pivot connection. The engaging base 176 also includes a plurality of notches 180a and 180b. The notches 180a and 180b selectively engage rise member 172 of connecting portion 171 to selectively retain the engaging member 177 in a select position in relation to the connecting portion 171. Hence, in an embodiment, the engaging member 174 can be adjusted in any number of positions to aid in the placing and removing of a device.

Figure 5A:
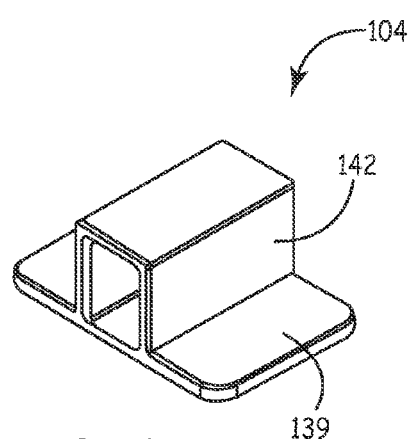
FIG. 5A is a side perspective view of a receiving member of one embodiment of the present invention.
Figure 6A:
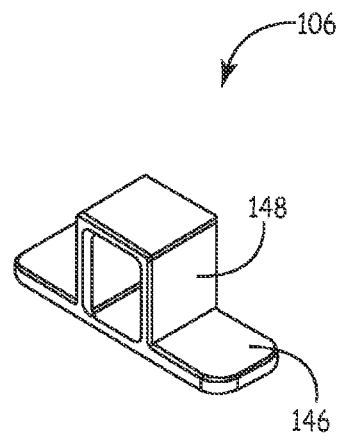
FIG. 6A is a side perspective view of a guide member of one embodiment of the present invention.
Figure 5B:
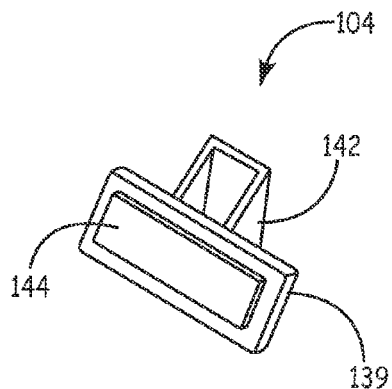
FIG. 5B is a bottom perspective view of the receiving member of FIG. 5A.
Figure 6B:
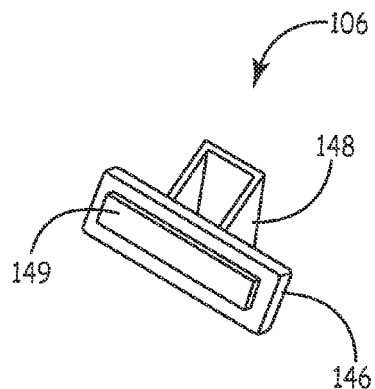
FIG. 6B is a bottom perspective view of the guide member of FIG. 6A.

FIG. 5A illustrates a side perspective view of a receiving member 104. The receiving member 104 includes a receiving member base 140 and an extending portion 142 that extends from the receiving member base 140. The extending member 142 includes passage 502 in which an engaging member 164, or 174 of an engaging head 160 can be received. The extending portion 142 is also designed to be received in a slot of the cage such as slot 114 of cage 102 of FIG. 1. FIG. 5B illustrates a bottom perspective view of the receiving member of FIG. 5A. On the bottom of the receiving member base 140, in this embodiment, is an adhesive strip 144 that couples the receiving member to a device 130. The adhesive strip 144 includes an adhesive. FIG. 6A illustrates a guide member 106 of one embodiment. The guide member 106 includes a guide member base 146 and an extending portion 148. The extending portion 148 of the guide member 106 is designed to be received in slot 114 of cage 102. The guide member 148 guides the device 130 into and out of the cage 102. FIG. 6B illustrates the bottom view of guide member 106. As illustrated, the bottom of the guide member base 146 also includes an adhesive strip 149. Adhesive strip 149 is used to couple the guide member 106 to the device 130. Although the embodiments of the receiving member 104 and the guide member 106 illustrated in FIGS. 5A, 5B, 6A, and 6B, shown two separate bases 139, and 146, in one embodiment the two bases are simply one base member with the extending portion 142 of the receiving member being spaced from the extending portion 148 of the guide member a select distance.

Figure 7:
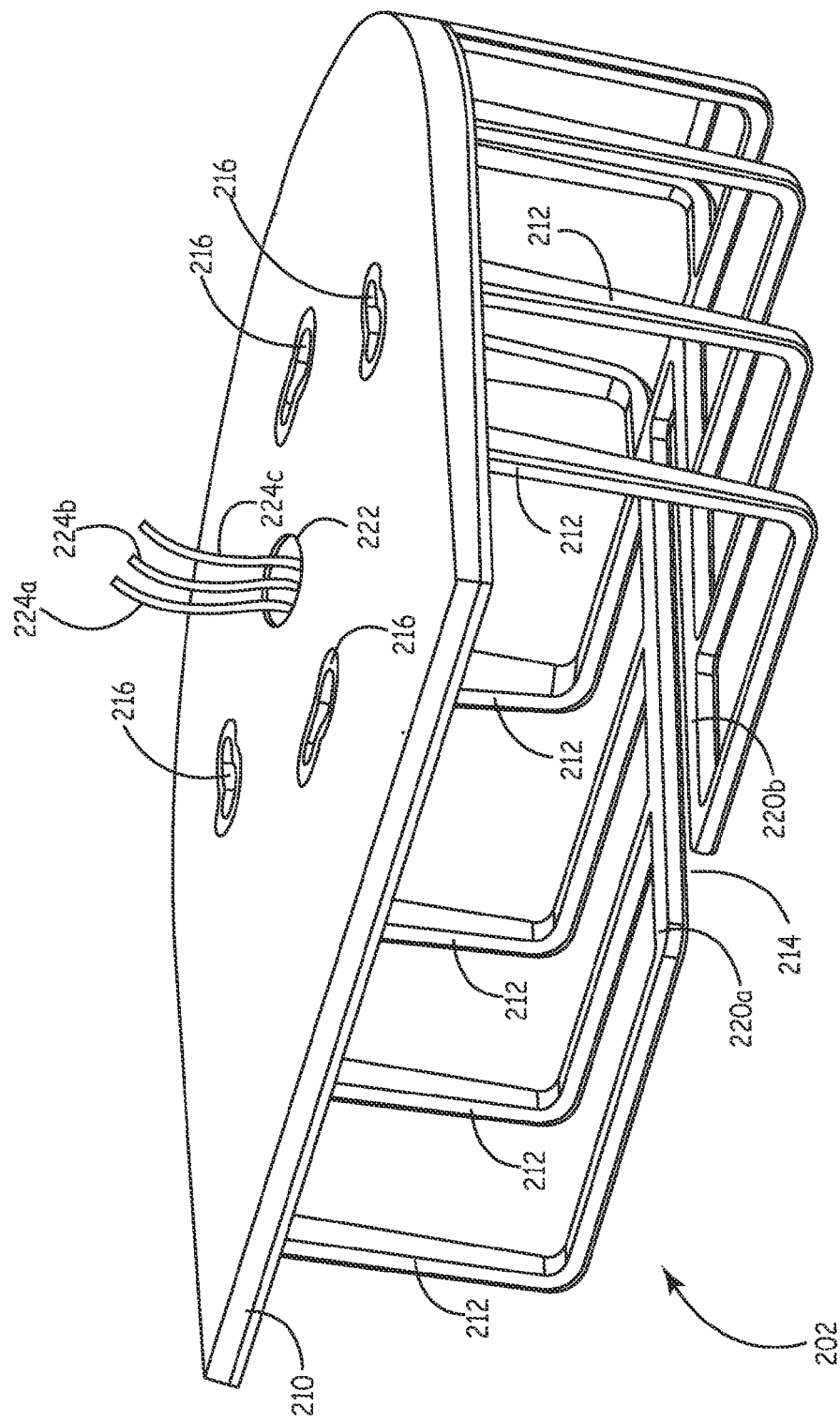
FIG. 7 is a front perspective view of a cage of yet another embodiment of the present invention.
Figure 8A:
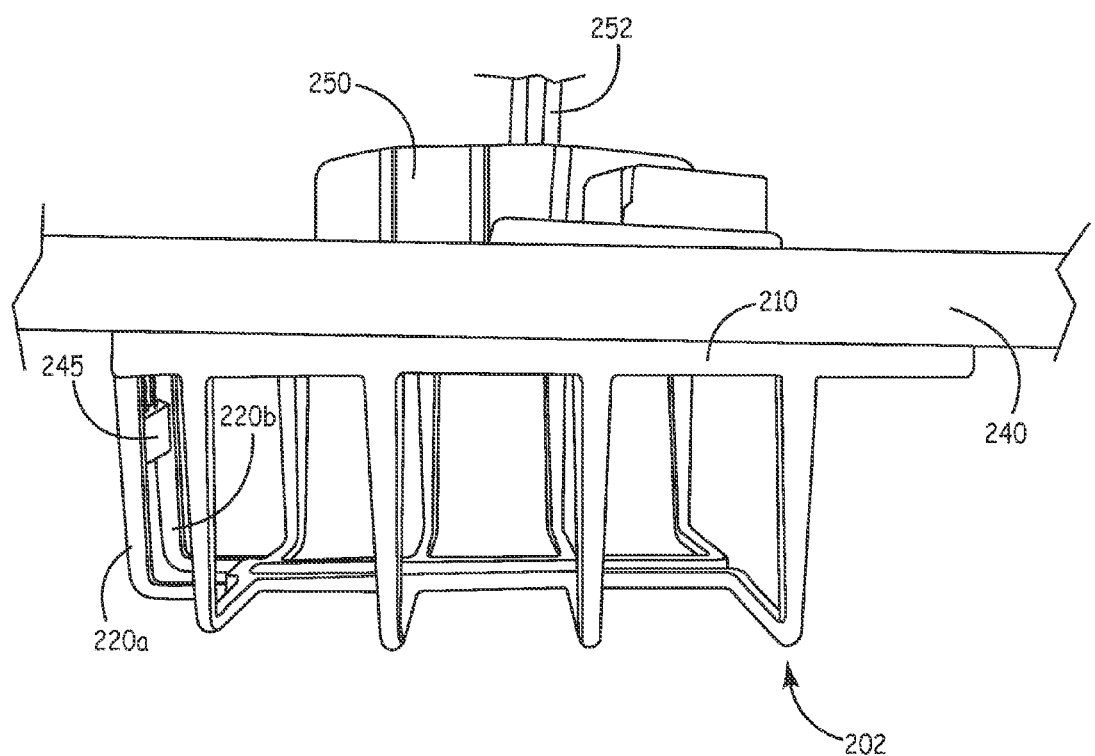
FIG. 8A is a side perspective view of a cage of FIG. 7 coupled to a structure of a building.

FIG. 7 illustrates another embodiment of a cage 202. This cage 202 includes a base 210 that can be selectively coupled to a ceiling or wall by connecting apertures 216. Arms 212 extend from the base to form a chamber in which a devise can be held. Arms 212 terminate in respective rails 220a and 220b to form slot 214. In this embodiment, the base 210 includes wiring, in particular wires 224a, 224b and 224c extending from aperture 222 allow the remote device access system to be connected to the wiring of a building and supply power to the device. FIG. 8A illustrates a side view of cage 202 coupled to a ceiling 240. As illustrated wiring 252 of a building is routed into a standard electrical box 250. Wires 224a, 224b and 224c in FIG. 7 are electrically connected to wiring 252 in an electrical box 250. Wiring 224a, 224b and 224c are routed through the base 210 of the cage 202 to an electric receiver 245 illustrated in FIG. 8A. The electric receiver 245 is coupled between end arms 220a and 220b of the cage 202 in this example embodiment. Wires 224a, 224b, 224c that pass through the base 210 also pass through electric receiver 245 and are coupled to connections 830a, 830b, and 830c as illustrated in the close up view of FIG. 8B. In one embodiment, the electronic receiver 245 is slidably engaged to end arms 224a and 224b so that the connectors 830a, 830b and 830c of the electric receiver can be selectively positioned to engage connectors of a select device. FIG. 8C illustrates one example embodiment of an electric receiver that is slidably coupled to the end arms 220a and 220b. As this top view illustrates, the electric receiver 245 includes engaging ends 801a and 801b that engage the end arms 220a and 220b. Engaging end 801a is movably coupled to a main housing 805 of the electric receiver 245. In particular, the main housing 805 includes a chamber 806 in mid portion 804 of the engaging end 801a. The mid portion 804 is slidably received in chamber 806 of the main housing 805. A biasing member 802 (spring in one embodiment) is received in chamber 806 of the main housing 805. The biasing member 802 asserts a force on engaging end 108a to maintain the engagement of the electric receiver 245 in contact with end arms 220a and 220b. However, this arrangement allows for the electric receiver 245 to be slid about end arms 220a and 220b to adjust the electric receivers 245 position. In addition, wires 224a, 224b and 224c are designed to have enough play in them so that movement of the electric receiver 245 is not hampered.

Figure 9:
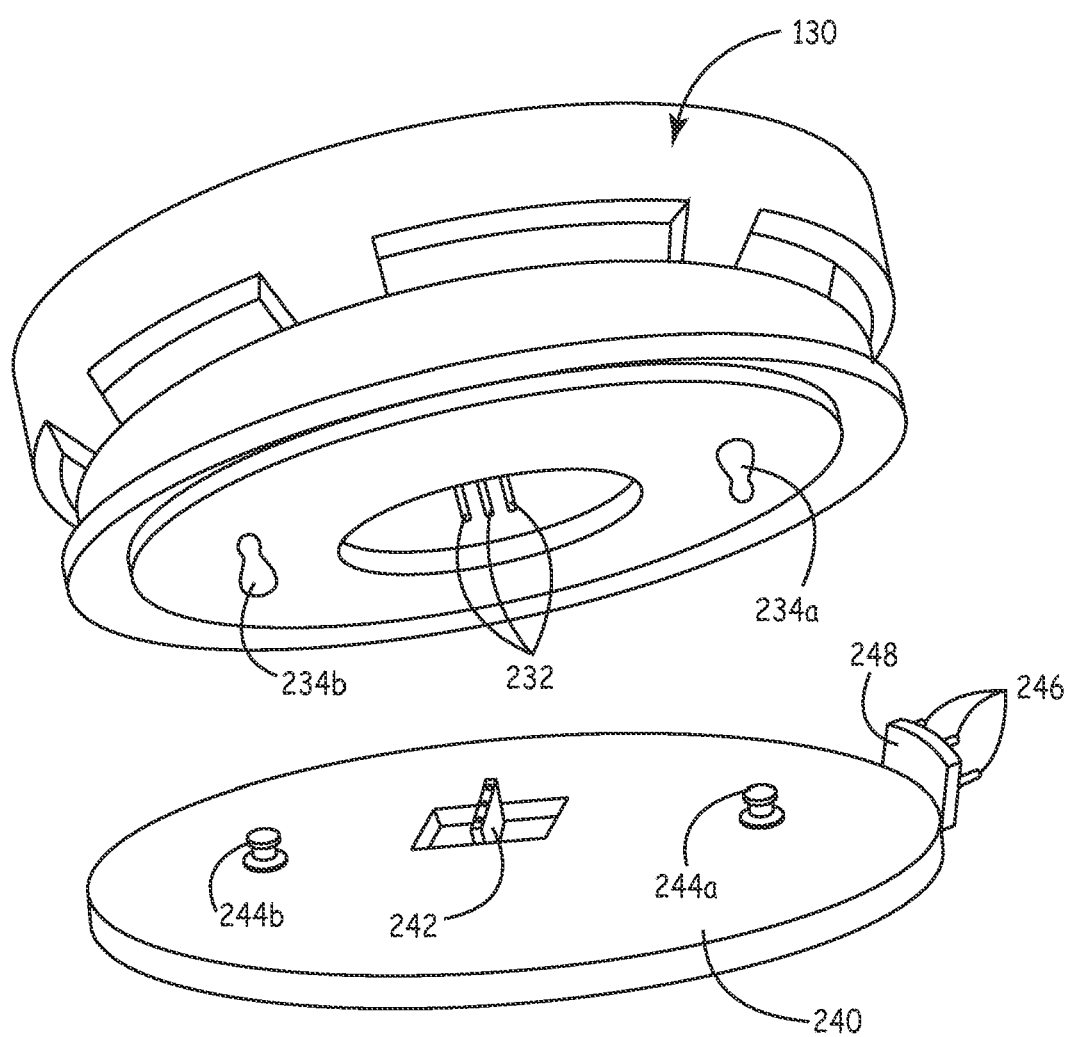
FIG. 9 is a side perspective view of an electrical connection base of one embodiment of the present invention in position to be coupled to a device.

FIG. 9 illustrates one example of an electrical connector base 240 for a device 130 of one embodiment. In particular FIG. 9 illustrates a side perspective view of a device 130 including devices connector slots 234a, 234b and electrical probes 232. The electrical connecting base 240 is coupled to device 130. In particular connecting pins 244a and 244b of electrical connecting base 240 are selectively engaged in connector slots 234a and 234b to couple the electrical connecting base 240 to the device 130. Electrical connector 242 is coupled to electrical probes 232 of the device 130. Electrical connector 240 is in turn electrically coupled to device electric plug 248. Device electric plug 248 includes connectors 246 that are selectively coupled to connectors 830a, 830b and 830c of the electric receiver 245 shown in FIG. 8B. In this embodiment, the operator simply connects electrical connecting base 240 to the device 230. The operator will then also connect a receiving member 104 and a guide member 106 on the device 103 as discussed above. Engaging head 160 on an elongated member is then engaged to the receiving member 104. The device 130 is then lifted and placed in a cage such as cage 202 of FIG. 8A. In particular, guide member 806 and receiving member 104 on the device 130 are received in slots 214 in such a manner that device electric plug 248 coupled to device 130 is positioned so that connectors 246 of the device electric plug 248 will engage connectors 830a, 830b and 830c of the electric receiver 245 when the device is slid into the cage 202.

Figure 10:
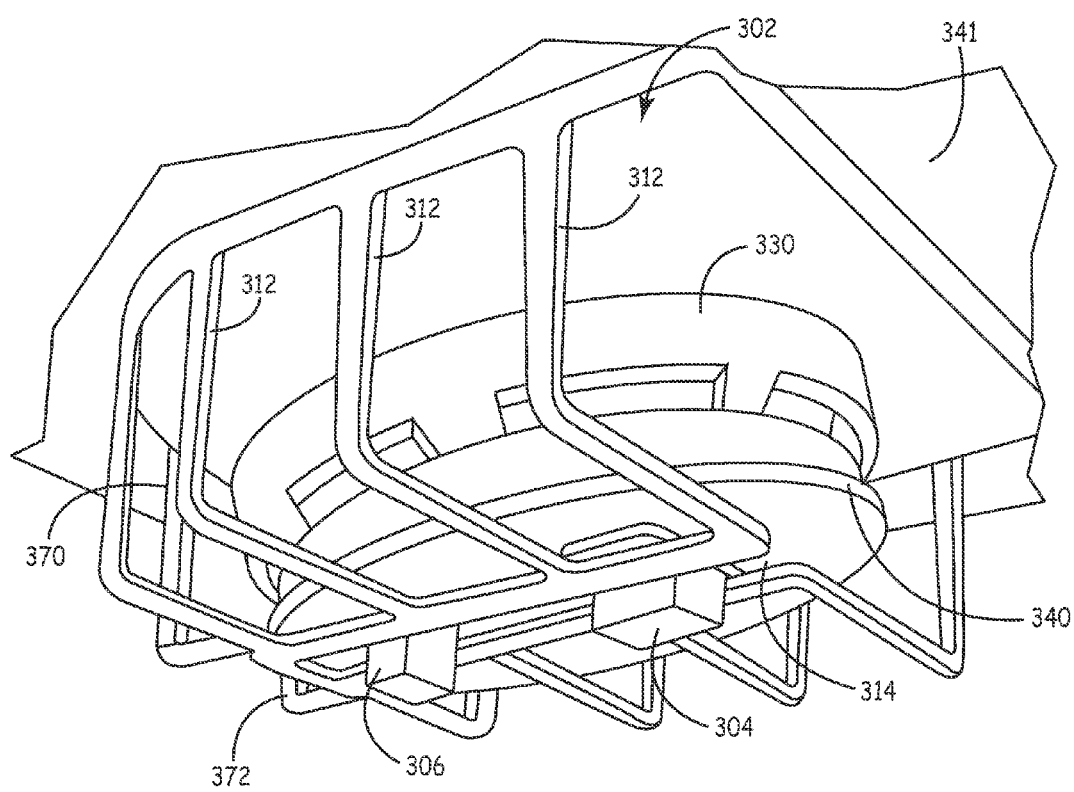
FIG. 10 is a side perspective view of a cage of yet another embodiment of the present invention.

FIG. 10 is a side perspective view of another embodiment of a remote access device system. In this embodiment, the device 330 is placed in the cage 302 upside down. This may be desired in embodiments where the device 30 has a top surface that has a shape that does not lend to the receiving member 304 or the guide member 306 being coupled thereto. The cage in this embodiment includes arms 312 and end arms 370 and 372 that form a chamber that a device 330 can be received in similar to the embodiments described above. A slot 314 is also formed in the arms in which the guide member 306 and receiving member 304 are received similar to other embodiments described above. In one embodiment an electric receiver 245 as described above coupled across end arms 370 and 372 (not shown in FIG. 10) allow an electrical connection between wiring in an electric box of a building and an electrical connect base 340 coupled to the device. Hence in this example embodiment, the guide member 306 and the receiving member 304 are coupled to the electrical connect base 340. Also in an embodiment, enough space is provided between a base and the cage 302 so that air flow is not hampered to the device 130 even though the device is placed upside down.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A remote device access system, the system comprising:
   a receiving member configured to be coupled to a device that is to be positioned in an out of arms reach location;
   an engaging head configured to be coupled to an elongated member, the engagement head further configured to selectively engage the receiving member coupled to the device;
   a containment cage configured to be coupled to a surface at the out of arms reach location, the containment cage forming a containing chamber configured to selectively hold the device, the elongated member configured to place and remove the device from the containing chamber of the containment cage via the engaging head and receiving member; and
   an electric receiver coupled to the containment cage configured to provide an electric connection between wiring in a building having the surface at the out of arms reach location and the containment cage.

2. The system of claim 1, wherein the containment cage further includes a slot configured to receive the receiving member.

3. The system of claim 1, wherein the containment cage further comprises:
a base configured to be mounted on the surface of the out of arms reach location; and
a plurality of spaced holding arms extending from the base to form the containing chamber.

4. The system of claim 3, further comprising:
a first rail;
a second rail; and
an end rail coupled between an end of the first rail and an end of the second rail, at least some of the spaced holding arms terminating in a respective one of the first rail and the second rails, the first, second and end rails defining a slot configured to receive the receiving member.

5. The system of claim 4, wherein the containment cage has an opening to the containing chamber that faces the same direction as an opening to the slot defined by first, second and end rails.

6. The system of claim 4, further comprising:
a guide member configured to be coupled to the device, the guide member further configured to be received in the slot of the containment cage to guide the device into and out of the chamber of the containment cage.

7. The system of claim 6, wherein the guide member is positioned on the device to be aligned with the receiving member so the guide member and the receiving member both can be received in the slot of the containment cage.

8. The system of claim 1, wherein the receiving member includes a passage that the engaging head is selectively engaged in.

9. The system of claim 8, wherein the engaging head includes a connecting portion with a head channel configured to receive an end of the elongated member and an engaging member configured to be selectively received within the passage of the receiving member.

10. The system of claim 9, wherein the engaging member of the engaging head is pivotally coupled to the connection portion of the engaging head to allow different engaging member positions in relation to the elongated member.

11. The system of claim 1, further comprising:
an electrical connector base configured to be coupled to the device, the electrical connector base providing an electrical connection between the device and the electric receiver of the containment cage.

12. The system of claim 1, wherein the electric receiver is movably coupled to the containment cage to adjust the electrical receiver's position.

13. A remote device access system, the system comprising:
a retaining portion having a base and a cage, the base configured to be coupled to a surface, the cage coupled to the base, the cage configured to hold a device;
a receiving member coupled to the device, the receiving member configured to be received in a slot in the cage, wherein when the device is retained within the cage the receiving member in the slot extends out of the cage; and
an engaging head configured to be mounted on an end of an elongated member, the engaging head having an engaging member configured to selectively engage the receiving member to position the device in and out of the cage.

14. The system of claim 13, wherein the cage further comprises;
a plurality of spaced generally L-shaped arms having first ends extending from the base proximate an outer parameter of the base to form a cavity to hold the device;
a first rail;
a second rail; and
an end rail, the end rail coupled between an end of the first rail and an end of the second rail forming generally a U-shape that defines the slot of the cage, second ends of at least some of the arms coupled to one of the first rail and the second rail.

15. The system of claim 13, further comprising:
a guide member coupled to the device, the guide member configured to be received in the slot to guide the device when the device is being put into and removed from the cage.

16. The system of claim 13, further comprising:
an electric receiver coupled to the retaining portion configured to provide electrical connections to wiring in a building the retaining portion is coupled to; and
a electrical connector base configured to be coupled to the device to provide electrical connections between the device and the electric receiver.

17. A retaining device comprising:
a base configured to be attached to a structure, the base having generally a U-shape with a curved outer edge portion and a relatively straight edge portion;
a plurality of spaced generally L-shaped arms having first ends extending from the base proximate the curved outer edge of the base to form a cavity to hold a device;
a first rail;
a second rail; and
an end rail, the end rail coupled between an end of the first rail and an end of the second rail forming generally a U-shape that defines the slot of the cage, second ends of at least some of the plurality of the arms coupled to one of the first rail and the second rail, wherein an opening to the slot and an opening to a chamber formed by the base and the plurality of arms and are in a direction that faces the relatively straight portion of the base, the chamber configured to selectively hold a device.

18. The retaining device of claim 17, further comprising:
the base having a front end along the relatively straight edge portion, the base having a second end on a section of the curved outer edge portion opposite the front end, the front end of the base having a first height that is less than a second height at the second end of the base so that when the base is coupled to a ceiling, a device in the chamber will be positioned by gravity near the second end of the base to keep the device in the chamber.

19. The retaining device of claim 17, further comprising:
base wiring in the base configured to be electrically coupled to building wiring in a building the base is coupled to; and
an electric receiver coupled to the base wiring, the electric receiver movably coupled between a pair of the arms, the electric receiver configured to provide and electric connection between the base wiring and device wiring of the device selectively held in the chamber.

* * * * *

UNITED STATES PATENT AND TRADEMARK OFFICE
CERTIFICATE OF CORRECTION

| | | |
|---|---|---|
| PATENT NO. | : 7,971,844 B2 | Page 1 of 1 |
| APPLICATION NO. | : 12/701855 | |
| DATED | : July 5, 2011 | |
| INVENTOR(S) | : Dwight Newport | |

It is certified that error appears in the above-identified patent and that said Letters Patent is hereby corrected as shown below:

Title Page
"Assignee: New Ports Helpers LLC" should read -- Assignee: by New Ports Helpers LLC --.

Signed and Sealed this
Sixteenth Day of August, 2011

David J. Kappos
*Director of the United States Patent and Trademark Office*